UNITED STATES PATENT OFFICE.

FRANCIS A. ELLIOTT, OF ABINGDON, ILLINOIS.

PLASTIC COMPOSITION.

1,238,072.     Specification of Letters Patent.     Patented Aug. 21, 1917.

No Drawing.     Application filed March 25, 1916. Serial No. 86,591.

*To all whom it may concern:*

Be it known that I, FRANCIS A. ELLIOTT, a citizen of the United States, and resident of Abingdon, in the county of Knox and State of Illinois, have invented a new and useful Plastic Composition, of which the following is a specification.

My invention relates to a compound which may be used as a substitute for gaskets and packing-rings on flanged joints, for covering sand-holes in cast pipe, as a sealing material for pipe-connections, cylinder heads, etc., and for a great variety of other purposes too numerous to mention. Generally stated it may be said that I have sought to produce a compound which is quickly convertible into a paste which may be effectively utilized in retaining air, gas, hot or cold water, steam, ammonia, volatile oils, etc., and may be successfully used in retaining a vacuum.

The principal object of the invention is to provide a compound of the nature described which will effectively perform the ends desired, which will not be affected by heat, by freezing, or by other exposures, either before or after being employed, and which may be commercially offered in a desirable state.

In manufacturing the compound I first dissolve eight pounds of glue or like gelatinous ingredient in substantially sixty-five pounds of water. This mixture is then heated until it is clear. In a separate vessel I mix about sixty pounds of starch paste with twenty pounds of water and boil for a suitable length of time—say five minutes. Into this the glue solution is then poured, and while cooking I add either: eight ounces of carbolic acid; or eight ounces of creosote; or ten ounces of formaldehyde; or sixty ounces of silicate of soda; or any other suitable disinfectant, deodorizer or preservative. If this be omitted the starch and glue would be likely to decay and ferment, thus ruining the compound. The quantity of disinfectant, deodorizer or preservative selected must be in proportion to its strength and effectiveness. While the compound is still hot and in thin liquid form I thoroughly mix it with about one-hundred pounds of chalk, talc, or clay. When the compound thus formed has dried it is ground quite fine—in fact, preferably into a powder, and as it is practically free from odor it may be offered in a commercially desirable state, facilely shipped in either cans or sacks.

To use the compound it is necessary only to mix with it sufficient water to reduce it to the consistency of soft, fresh putty.

I have found by a series of tests that it will stand a pressure of over 600 pounds to the square inch, exposed to either extreme heat or extreme cold, without blowing out or being otherwise affected. Should it become frozen it is immaterial, for it is not injuriously affected by freezing. All pipe-unions, fittings and connections can be made to stand pressure by using the compound, thus eliminating gaskets. It does not affect water passing through pipes on which it has been used. It is non-corrosive and will prevent rust on threaded joints. Such joints whereon the compound has been used are easily disconnected.

Having thus described the nature of my invention, having specified the preferred ingredients, having set forth the best way now known to me of compounding and preparing it, and having noted some of its many uses and advantages, I claim:

A compound for sealing joints and for other purposes, comprising glue, about eight pounds; water, about 85 pounds; starch paste, about 60 pounds; an earthy ingredient, about one hundred pounds; and a sufficient quantity of suitable preservatives to prevent deterioration.

In witness whereof I hereunto subscribe my name this 22nd day of March, 1916.

FRANCIS A. ELLIOTT.